United States Patent
Harris et al.

(10) Patent No.: US 7,539,622 B1
(45) Date of Patent: *May 26, 2009

(54) PROGRAMMABLE RFID POSTAGE STAMPS

(75) Inventors: Christopher Harris, Southampton (GB); Katherine Shann, Eastleigh (GB); Leon Roberts, Hants (GB); Alexandra Pickerill, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/190,758

(22) Filed: Aug. 13, 2008

Related U.S. Application Data

(63) Continuation of application No. 12/036,563, filed on Feb. 25, 2008, now Pat. No. 7,457,760.

(51) Int. Cl.
 G06Q 10/00 (2006.01)
 G06Q 30/00 (2006.01)
 G06F 7/00 (2006.01)
 G08B 13/14 (2006.01)
(52) U.S. Cl. .................... 705/1; 705/401; 700/227; 340/572.7; 340/572.8
(58) Field of Classification Search .............. 705/1, 705/401; 700/227; 340/572.7–572.8
See application file for complete search history.

(56) References Cited

U.S. PATENT DOCUMENTS

| 5,684,705 | A | 11/1997 | Herbert |
| 2003/0140016 | A1* | 7/2003 | Grotsky et al. .......... 705/408 |
| 2005/0278263 | A1 | 12/2005 | Hollander et al. |
| 2007/0067248 | A1 | 3/2007 | Chatte |

OTHER PUBLICATIONS

IBM, Multiple Smart Cards on a Single Chromomorphic Card, IP.Com Electronic Publication, May 17, 2007.

* cited by examiner

*Primary Examiner*—John W Hayes
*Assistant Examiner*—Fadey S Jabr
(74) *Attorney, Agent, or Firm*—The Law Firm of Andrea Hence Evans, LLC

(57) ABSTRACT

The user can attach a stamp without a predetermined postage to an article to be mailed. The stamp has a top layer having a visual display, middle layer having an electronics layer, and a bottom layer having an adhesive layer. The stamp is encoded such that the visual display of the stamp is altered to indicate a state of the stamp. Postage of the article is determined by a postal authority worker and payment is authorized using the unique identifier. This eliminates the need for the sender to have any personal interaction with a postal worker to ship an article and eliminating the need for the sender to estimate postal cost prior to the article being received at the postal office. Altering the adhesive layer provides safe removal of the affixed stamp which can then be reused.

1 Claim, 3 Drawing Sheets

PROGRAMMABLE RFID POSTAGE STAMPS

RELATED APPLICATIONS

The present application is a continuation of prior U.S. application Ser. No. 12/036,563, filed Feb. 25, 2008, the entirety of which is incorporated herein by reference.

FIELD OF THE INVENTION

The present invention relates to a mailing system, particularly a system using a re-useable RFID postage stamp with a novel payment and anti-tampering method.

BACKGROUND OF THE INVENTION

Typically when mailing an object such as a parcel or package, for example, a postal customer or sender purchases stamps to cover the postage for the letters or parcels, etc. The sender must ensure that the postage is sufficient to cover the cost of the item being sent. If the sender has incorrectly weighed the item and provided insufficient postage, the item will be returned, undelivered or the additional cost will be passed on to the recipient.

It is possible for the sender to go to the post office or any delivery company and have the item to be mailed weighed and processed. The sender will then pay the full fee for a single stamp to cover delivery. However, this requires the sender to visit a physical location with its package during the post office's restrictive opening hours.

Currently, the post office has added a pay and print service. To use the pay and print service, the sender pays a postal fee using a credit card online and downloads and prints a unique bar-code for the item to be shipped. The sender enters the size and weight of the item onto the website. However, the pay and print service has multiple drawbacks such as incorrectly weighing the item to be shipped and entering the incorrect information about the item onto the website, to name a few. Furthermore, the sender has to take the time to print the stamp, which may have incorrect information on it, which will cause a delay in its shipping and processing.

Other significant problems with the current mailing system are that several parcels are often missing and packages are not delivered or delivered to the wrong recipient each year. Various schemes exist to mitigate these problems, including specialized letters with embedded RFID technology to trace through the postal and sorting systems, bar-coding and other identifying mechanisms to help either remove systemic failures or provide some way of more easily identifying an item when it is found.

SUMMARY OF THE INVENTION

This invention introduces a single re-usable stick-on section of electronic paper, in the form of a postage stamp, containing an RFID chip. All the sender is required to do is simply affix the stamp to a parcel and swipe a smart card over the stamp to encode it. Once encoded, the sender can send the parcel via any number of 24-hour 7 day a week post-boxes, or for larger items some other deposit or collection mechanism may be used. When the sender's smart card is swiped over the stamp, the chip will be programmed with the sender's information such as payment details linked to the smart card so that the accurate cost of sending the item can be calculated and charged during the sorting process. During the sorting process, the item is accurately weighed and measured by the postal office. An anti-tampering mechanism is also provided to allow the stamp to be reused without jeopardizing the prior sender's personal and financial information. Also, the stamp may be encoded using the Bluetooth protocol.

An aspect of an embodiment of the invention provides variable images to be displayed on the face of the stamp.

A further aspect of an embodiment of the invention provides a reusable postage stamp that can be reused by the post office removing or reselling the stamp or through the recipient of a parcel removing the stamp from parcels the recipient has received.

A further aspect of an embodiment of the invention provides a tamper protection mechanism for protecting the sender from interception and theft of the postal cost.

A further aspect of an embodiment of the invention provides a single calculation of the cost of postal services to be determined by the postal office, eliminating the need for the sender to have any personal interaction with a postal worker to ship a parcel and eliminating the need for the sender to estimate postal cost prior to the parcel being received at the postal office.

Additional aspects, objectives, features and advantages of the present invention will become apparent from the following description of the preferred embodiments with reference to the attached drawings.

DETAILED DESCRIPTION OF THE INVENTION

Figure 3:
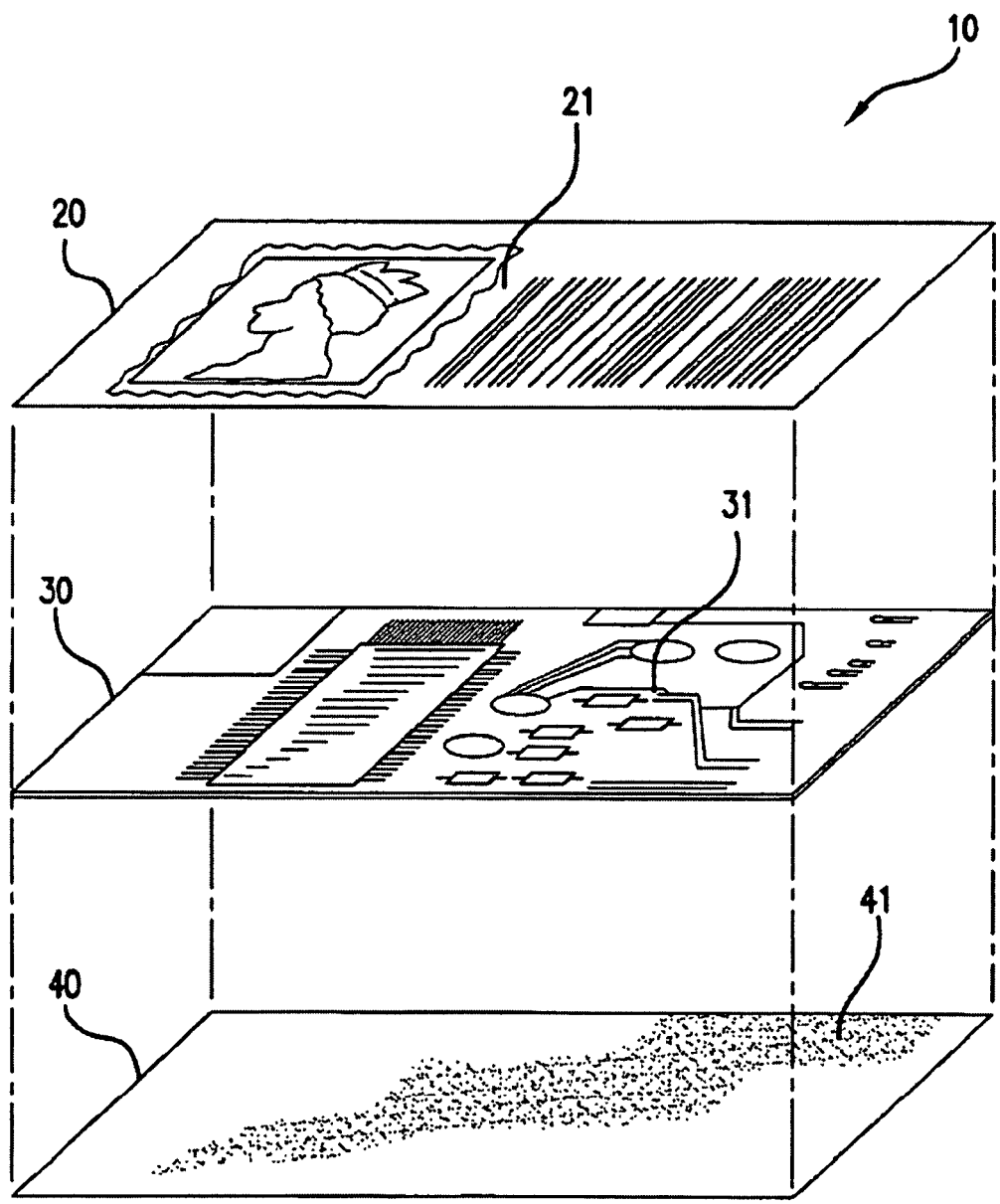
FIG. 3 illustrates the layers of the stamp of the present invention.

FIG. 3 illustrates the layers of the stamp 10 of the present invention. The stamp has three layers including a top layer 20 having a visual display 21, a middle layer 30 having an electronics layer 31, and a bottom layer 40 having an adhesive layer 41 consisting either a standard adhesive or an electrostatically modifiable synthetic gecko material.

The stamp 10 also has an outer protective coating manufactured from a flexible plastic. The stamp is typically 35 mm by 35 mm, however the dimensions of the stamp are only limited by the size of the electronics and the clarity of the digital electronics paper display. Thus, the size of the stamp can be altered accordingly. The stamp 10 is unpowered except during use: there is no internal power supply. Using passive RFID like reading protocols, the stamp alters state only when powered. Passive RFIDs rely on converting the radio signal from the reading device into power to be used to return the signal. Digital electronic paper is a form of stable display: it only requires power to alter the contents of the display, not to maintain the display. There are no continuous power drains.

The top layer 20 consists of digital electronic paper. This is a well known flexible material consisting of a series of electrodes and numerous microscopic chambers with positive and negatively charged colored particles. The visual display 21 provides variable images to be displayed on the stamp 10 such as the postal method, the sender's information or the receiver's information, to name a few.

The second layer 30 is the electronics layer 31, consisting of a flexible substrate with electrical pathways and semiconductor chips embedded in it, which is electrically connected to the top layer 20 to allow the electronic paper to be controlled and to allow for the altering of the visual display 21.

The electronics layer 31 comprises a RFID chip and a microcontroller, amongst several electrical pathways and chips. For purposes of illustrating the present invention, the RFID chip and the microcontroller will be discussed. The chip stores a unique stamp identification number, unique payment identifier and a postal method, e.g. first class, air-mail, recorded delivery etc., as a minimum. Extra data fields would be available to store additional address data or for future expansion.

Each stamp 10 has a unique identifier or stamp identification number. This is a serial number that allows the stamp to be traced. This number does not change between uses. The payment identifier is a unique number used to trace the payment mechanism so that the cost of postage can be taken from the correct account. This is the single shot number. It consists of a payment type signifier, the account lookup number and checksum data. The payment type signifier is a numerical ID that points to a particular bank or charging mechanism e.g. if taken from a debit card it points to the issuing bank. The actual payment number is a number that only makes sense to the issuing bank or post office account. It is not to be actual account number, but merely a number known both to the bank and to the charging device such as the smart card. Each number is unique and the bank or post office merely looks up the code and connects it to the correct account. This prevents the account details from being fraudulently removed from the chip and limits the potential fraud to a single postal transaction. Finally, checksum information is included which ensures that data corruption is detected and compensated for.

The single shot number or the payment number is generated by the payment authority such as the banks, credit card companies or the post office, for example, and provided to the user on a payment mechanism such as a special smart card, mobile phone program, key ring attachment, etc. The payment authority would provide a non-sequential batch of numbers to a single user, say 100 at a time, and the payment mechanism would provide a single number to a single stamp.

When payment is required the post office looks at the payment number and determines if the stamp has been corrupted. If there has been no corruption, then the worker determines which payment authority it should direct the payment to. When a payment authority receives a payment number, it checks to see which account the number corresponds to and pays the post office the relevant fee from that account. This method prevents the sender from having to improperly estimate the amount of payment due before mailing the article and prevents the sender from having any personal interaction with a postal worker.

Payment could be taken using one of the following mechanisms: credit card, debit card, smart card, directly from your bank or building society, or by having an account with the post office. A post office account would allow people to pay using a specified bank account or a pre loaded card or at the branch. Other options include a prepay system which involves paying at post office branch or using a vending like post box. The smart card can be the card described in the Technical Disclosure entitled Multiple smart cards on a single chromomorphic card authored by IBM.

Postal method is the method of posting requested. This is a well defined number such that, for example, I might be First Class, 2 Second Class, 3 12Noon special delivery, 4 9 am Special Delivery etc. Lastly, Freeform Data is an additional field and is not required for all implementations. Within this field could be stored information such as: sender address; destination address or any other information required. This would also allow future expansion of additional information.

The postal method and free form data may be displayed on the visual display 21.

The electronics layer 31 also houses the microcontroller. One aspect of the present invention discloses a microcontroller using a non-reusable anti-tamper method 55 and another aspect of the present invention discloses a microcontroller using a reusable anti-tamper method 50.

Figure 1:
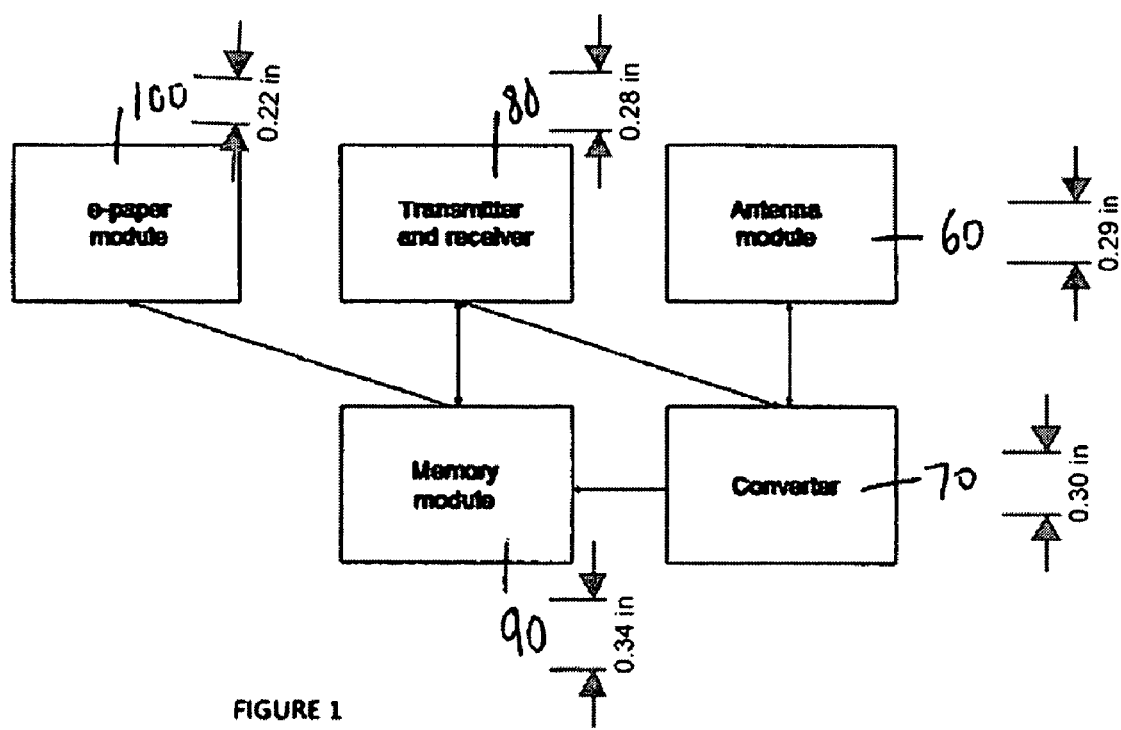
FIG. 1 is a block diagram of a microcontroller of the stamp with a non-reusable anti-tampering method.

The block diagram of the microcontroller using a non-reusable anti-tamper method is illustrated in FIG. 1. The microcontroller comprises an antenna module 60, a converter module 70, a transmitter and receiver module 80 and a memory module 90. Prematurely removing the stamp tears vital internal wires, disabling the stamp in this embodiment.

The antenna module 60 is a one or two part antenna, depending on required read/write frequencies. It consists of two different antennas that can read a single frequency, or combined serially to be able to effectively read different frequencies of radio waves. It is linked solely to the Converter module 70. The converter module 70 is standard in RFID technologies. It exists to receive and store the energy of the received radio waves, which is passed on to both the memory module 90 and the transmitter and receiver module 80. The transmitter and receiver 80 is provided with both power and data, whereas the memory module 90 receives only power. This power is absorbed from the difference in received signal power to relayed signal power is how the stamp absorbs the energy. Energy is stored in capacitors in this module 90 to be used over a short period of time, allowing the stamp 10 to manage power more effectively. The Transmitter and Receiver Module 80 receives power and data signals from the Converter module 70. The module 80 interprets the signals as Bluetooth™, radio or induction and generates the required protocol responses. This also triggers the relevant updates to the Memory module 90. The Memory Module 90 receives power from the converter 70 to update the e-paper module 100, according to values held internally, or to update the values of the internal registers. The memory module 90 does not draw power or update anything until the Transmitter and Receiver module 80 signals that the contents must change. For example, altering the postal method may trigger a new image to be displayed on the visual display 21. In order to save power, only incorrect display elements will be adjusted, not the entire display. The E-Paper Module 100 is not hosted on the electronics layer 31, but may require some circuitry to control the addressing of the pixels on the digital electronic paper layer 20. Alternatively this control circuitry could be incorporated into the memory module 90. The module 100 merely updates the monochrome or color display when signaled to do so from the memory module 90. Power is required only for the update and is provided through the memory module 90 itself.

Figure 2:
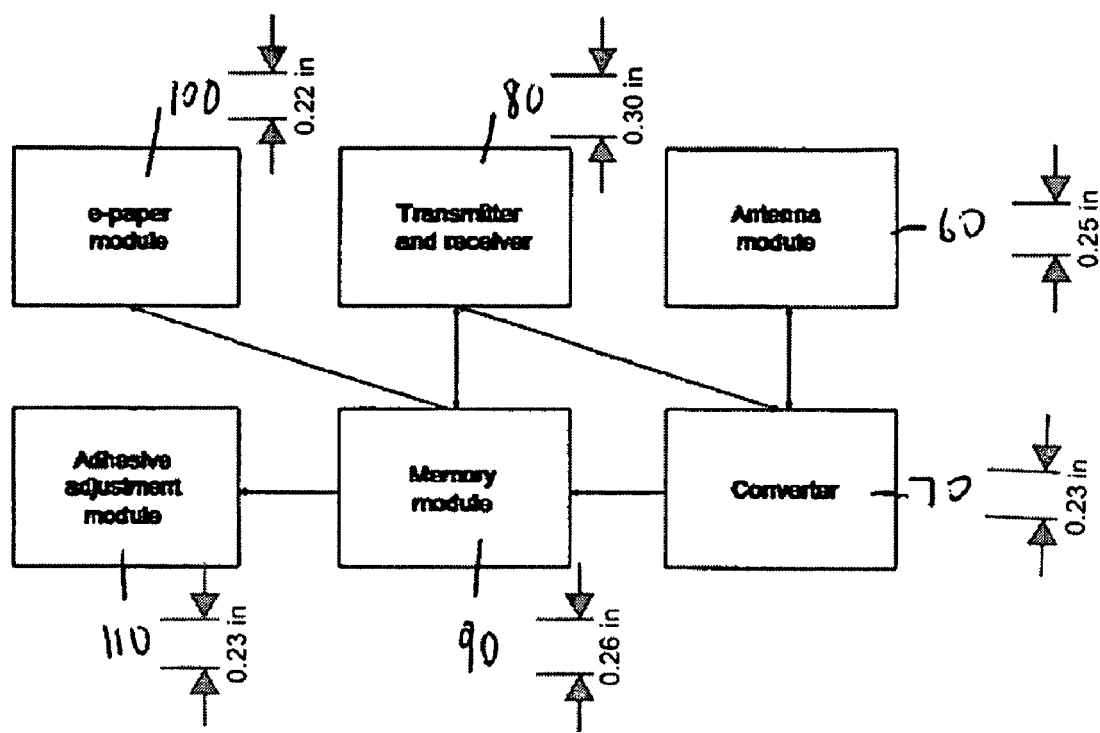
FIG. 2 is a block diagram of a microcontroller of the stamp with a reusable anti-tampering method.

The block diagram of a microcontroller using a reusable anti-tamper method 50 is shown in FIG. 2. The externally visible variation between FIG. 1 and FIG. 2 is the addition of the Adhesive Adjustment Module 110. There may be an additional field required in the memory module 90 to indicate the state of the adhesive, or it could be keyed off the default uncharged image such that when the default image is displayed, the adhesive layer 41 will be such that the stamp is slightly sticky and when any other image is displayed after encoding the adhesive layer 41 will be such that the stamp is very sticky.

The Adhesive Adjustment Module 110 receives power and signal from the Memory Module 90, and adjusts the size of the active gecko material. Through electrostatic manipulation, the area of the adhesive is altered. This can make the substance very sticky or easily peel-able in a single direction.

The third layer 40 is an adhesive layer 41. The adhesive is preferably a synthetic gecko material. The synthetic gecko material is a non-glue based adhesive material that uses Van de Waals forces to attach to the article to be mailed. Unlike typical adhesives, the gecko material is crafted from millions of tiny, hard, plastic fibers that establish grip; a mere square two centimeters on a side can support 400 grains (close to a pound). For the synthetic gecko material, a link to the electronics layer 31 is also required to allow the reusable anti-tamper mechanism 50 to properly work. Various adhesives can be used for cost and ease of manufacturing; however, for reusability the synthetic gecko glue would allow the stamp 10 to be added and removed multiple times securely. Synthetic gecko material is created through millions of tiny hairs that allow a material to closely 'merge' with a surface. This causes the van de Waals forces to attract each hair microscopically to the surface. The gecko itself has to peel its foot off the surface it has stuck to. With a smooth outer surface and the stamp 10 itself being flexible, the stamp will be difficult to remove from the article without damaging the stamp.

In order to remove the stamp safely from the article, the stamp must be modified in some manner. Using a mechanism similar to digital paper, electrostatic differences are used to vary the length of the nanoscopic hairs that 'merge' with the envelope or parcel providing the adhesive force.

It is possible to alter the length of the nanoscopic hairs that provide the sticking force in the following way. The adhesive layer 41 has a lower plate and an upper plate. The lower plate has millions of nanoscopic holes through it. The upper plate has millions of tiny hairs on it. These hairs protrude through the lower plate to provide the adhesive contact. Varying the electrostatic charge and polarity across these plates will vary the length of the hairs that protrude through the lower plate, and hence the overall stickiness of the stamp (van de Waals forces require close molecular proximity, and drop off exponentially). Not all the surface has to vary the hair length, but a pattern could be used to allow a natural peeling motion from one corner to lift the stamp easily, and yet the stamp will hold strongly from any other direction.

With this anti-tampering method described in FIG. 2, anyone trying to prematurely or maliciously remove the stamp would tear the stamp or damage the electronics, destroying the payment information and preventing anyone from charging another users card. Upon arrival at the post office, subsequent to scanning and removal of the sensitive data, the gecko material would have an electrostatic charge applied so that the adhesive area is altered and reduced. When doing this a corner is marked using the digital electronic paper display 21 indicating a direction the stamp 10 should be removed in. Since no sensitive information is contained on the stamp 10, it is not a problem to remove the stamp 10 and use it on another item. Also to reuse the stamp, upon receipt of the item, the stamp can be peeled back in the direction of the arrow on the display and placed on another item. The stamp does not become fully sticky until the stamp has new payment information encoded on it. If the stamp is removed, the stamp records this and alters the stored contents, preventing transfer from cheaper letters to more expensive parcels. In addition to protecting the data, a warning will be displayed on the visual layer 21.

The stamp 10 is affixed to the article to be mailed by its adhesive layer 41. The terms article, object to be mailed, parcel, package, and letter are used interchangeably and have identical definitions in this context. The stamp 10 is affixed without a predetermined postage amount. Once the stamp 10 is affixed on the article, the stamp is activated or encoded via a smart credit card or smart debit card, for example. Other standard RFID reading/writing practices can be used to update the stamp 10. To activate the stamp 10, the user swipes their smart card's magnetic stripe over the stamp. The user can also use un-powered Bluetooth™ protocol from their mobile phone to activate the stamp. In the case of the smart card, the swiping of the magnetic stripe induces a current into the stamp 10, allowing the stamp 10 to record information from the card and alter the electronic paper that comprises the face of the stamp 10. This provides the user a visual indication on the visual display 21 of what has been imparted to the stamp 10 such as different stamp designs and textual information. Multiple swipes could easily be used to encode first class, second class or reset a stamp through a simple loop of options. To change the stamp information using the smart card, the user swipes the card over the stamp which transfers the payment identifier information. Multiple swipes can be used to change the postal method or to return the stamp to an uncharged state.

If the user encodes the stamp through the alternative un-powered Bluetooth protocol from their mobile phone, they will be able to use the UI in the mobile itself to select the options for the postage. Also with this mechanism, the user can record the address within the stamp itself to help prevent items being wrongly addressed, via a check between the stamp and the written address. The power to encode and change the face of the stamp will be provided through the close proximity of the radiating Bluetooth device.

During the encoding of the stamp, either through multiple swipes of a card, via a mobile phone or other device with Bluetooth, NFD (short range RFID interaction) devices, or specific induction devices, e.g. a key ring attachment provided by the post office, the digital electronic paper face will be altered to a series of pre-programmed images indicating the state of the stamp. For example, the state of the stamp on a first class stamp could be an image of a first class stamp as it is today, or it could be any image or text. The stamp would have a default image to show the stamp has not been encoded.

The stamp stores the information within itself in two forms, one is the visual representation of the stamp itself, and the other is the RFID encoding of the information. The visual representation can be of a form that allows a machine or human to verify the data. The RFID information allows the post office or the post person to process the article by tracking, recording and routing the letter accordingly. Once deposited, the article is processed by an automated sorting, sizing, weighing, address and stamp reading machine. This machine then calculates the cost of postage and either sorts the letter onwards or invokes the exception process for underfunded letters or parcels. It is at this point that the post office knows how much should be charged for a particular item and employs a stamp reader and wiper to determine who or where to charge for a particular letter. The calculated cost will then be passed to a billing system along with the information recorded in the stamp to charge the correct account. Should the letter be unfunded due to insufficient funds linked to the smart card, then subsequent sorting offices would check the RFID stamp against the database and then pass it to the underfunded insufficient funds letters or parcels exception process.

At the point the letter or parcel is weighed and measured and the postage has been determined, the verifying process begins. The postal authority worker compares the freeform data entered into the stamp such as sender address to the information on the article. Also, the worker further reviews the article to determine if the stamp has been tampered with based on a warning displayed on the stamp. Any anomalies can be passed to a human supervisor for clarification. A human would review both the internals of the stamp via a console and the visual display. A machine would only review the internal data held on the stamp. The stored information on the RFID chip, aside from the unique ID which is never erased, is wiped or deleted when the post office reads, weighs and charges for the item. At this point, the necessary data is copied into the post office data systems. Subsequently only the stamps' unique ID is necessary to link the data back.

The user's account can then be charged for the relevant costs associated with delivering the item. This would prevent the postal company from having to return or temporarily store the item until the payment is made. The information encoded onto the stamp is the latest number from a secret list of random numbers, known only to the bank and the encoding device, so that the bank can verify the encoding device used. This is similar to one shot credit card numbers or third party authentication tokens used by on-line banking services. This prevents the stamp providing information to lead back to the payment device, so the stamp cannot be used to clone the card. This also prevents the stamp from being used to pay for multiple packages rather than just the intended one. The encoded information is not just a random number, it also has some known values and checksums. These values will point the number to the correct payment authority such as a bank or mobile payment provider. The checksums are present to prevent data corruption and restrict the fraudulent creation of payment IDs.

The stamp may then be removed from the article using the reusable anti-tampering mechanism 50 described above in FIG. 2 or discarded if the non-reusable tampering mechanism 55 is used.

Please note the term post office is used synonymously with postal authority deposit location, postal company or postal system and the terms supervisor or postal worker is used synonymously with the term postal authority worker.

The RFID chip may also include a tracking mechanism which would allow continuous tracking of the package via its stamp. Also, the postal authority may also provide automatic refund mechanisms should the post be delayed in the case of guaranteed delivery by a certain date by authorizing the payment authority to refund the amount charged.

Also, the RFID may include the time and date of the actual posting to be recorded by the post receptacle such that the postman could verify that all posted letters have been picked up without loss.

The invention has been described in detail with particular reference to certain preferred embodiments thereof, but it will be understood that variations and modifications can be effected within the spirit and scope of the invention.

The invention claimed is:

1. A digital system comprising:
    a stamp without a predetermined postage affixed to an article to be mailed, wherein the stamp is a digital electronic paper comprising a top layer having a visual display, middle layer having an electronics layer, and a bottom layer having an adhesive layer;
    a microcontroller housed in the electronics layer comprising at least a converter module, transmitter and receiver module and a memory module, wherein the stamp is activated by swiping a smart card over the stamp in order to encode the stamp with a unique payment identifier valid for a single payment and other information by data signals sent from the converter module to the transmitter and receiver module;
    wherein the memory module receives power such that the visual display automatically updates to show a representation of the encoded information;
    wherein the visual display and the encoded information is verified on the stamp for evidence of tampering by the memory module indicating the state of the adhesive; and
    an anti-tamper mechanism comprising an adhesive adjustment module wherein the adhesive is altered through electrostatic manipulation from a signal sent by the memory module to the adhesive adjustment module to allow the removal of the affixed stamp so that the stamp may be reused.

* * * * *